United States Patent [19]

Damiral

[11] Patent Number: 5,267,831
[45] Date of Patent: Dec. 7, 1993

[54] AXIAL FLOW GAS TURBINES

[75] Inventor: Peter A. Damiral, Chaddesden, United Kingdom

[73] Assignee: Rolls-Royce plc, London, England

[21] Appl. No.: 573,947

[22] Filed: Jan. 18, 1984

[30] Foreign Application Priority Data

Feb. 26, 1983 [GB] United Kingdom ............... 8305400

[51] Int. Cl.⁵ .............................................. F02C 7/18
[52] U.S. Cl. .................................... 415/114; 415/175
[58] Field of Search ............... 415/2 A, 114, 115, 116, 415/117, 14, 175

[56] References Cited

U.S. PATENT DOCUMENTS

| | | | |
|---|---|---|---|
| 4,017,207 | 4/1977 | Bell | 415/117 |
| 4,199,300 | 4/1980 | Tubbs | 415/114 |
| 4,419,044 | 12/1983 | Barry | 415/117 |

*Primary Examiner*—Donald P. Walsh
*Attorney, Agent, or Firm*—Cushman, Darby & Cushman

[57] ABSTRACT

An axial flow gas turbine is provided with a shroud ring which is defined by two axially adjacent heat pipes. The radially inner face of the shroud ring has a plurality of axially extending cooling air passages located adjacent to it. Cooling air, which in operation is directed through the passages serves to provide cooling of the shroud ring and the substantial elimination of any radial heat flux in the shroud ring.

9 Claims, 2 Drawing Sheets

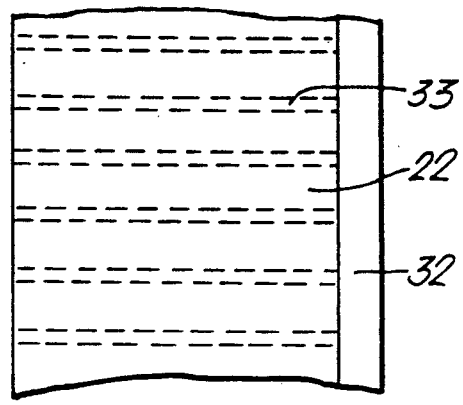
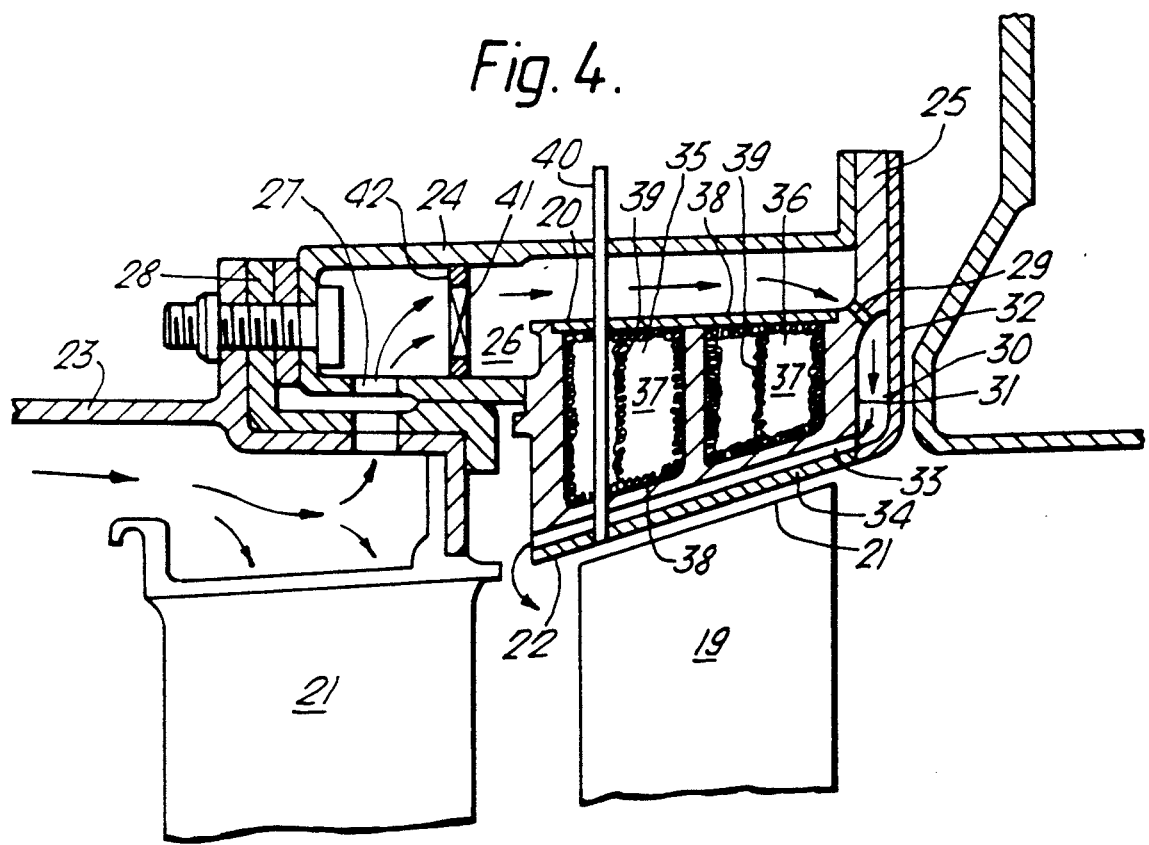

AXIAL FLOW GAS TURBINES

This invention relates to axial flow gas turbines.

Axial flow gas turbines conventionally comprise axially alternate annular arrays of rotary aerofoil blades and stationary aerofoil vanes, all of which are radially extending. Each array of rotary aerofoil blades is surrounded by a static structure which defines a radially outer portion of the gas duct through the gas turbine. The static structure is usually in the form of a shroud ring which is positioned so as to be as close as possible to the radially outer tips of the rotary blades. This is in order to reduce the gas leakage across the blades to an acceptably low level. Unfortunately the temperature of the gases which, in operation, pass through the turbine, tends to vary. This leads to thermal gradients within the shroud ring which in turn leads to its distortion and the consequent danger of shroud ring/blade tip contact occurring.

One way in which shroud ring distortion can be avoided is to provide a shroud ring which is defined by one or more heat pipes. Since heat pipes have excellent thermal conductivity characteristics, they are generally isothermal and are hence not subject to thermal gradients. They do, however, require to be cooled and this has been achieved by directing jets of cooling air on to the radially outer surface of the shroud ring. This results in a radially outward heat flux across the shroud ring which is not a desirable effect since it necessitates the shroud ring being sufficiently robust to withstand the thermal stress which results from such radial heat flux. This is particularly so when the gas turbine starts up from cold since under these conditions there is a period during which the shroud ring does not function as a heat pipe because of insufficient vapourisation of the liquid within the heat pipe. Such robust shroud rings are not desirable because of the weight penalty which they impose upon the gas turbine.

A further disadvantage of shroud rings which are defined by one or more heat pipes is that if there is a failure of the one or more heat pipes, thermal gradients are rapidly established within the shroud ring, thereby leading in turn to its distortion.

It is an object of the present invention to provide a cooled gas turbine shroud ring which is defined by one or more heat pipes and which is not subject to any substantial radial heat flux therethrough.

According to the present invention, an axial flow gas turbine comprises structure defining an annular gas passage extending therethrough and an annular array of radially extending rotary aerofoil blades located such that said rotary aerofoil blades extend radially across said annular gas passage, said structure including a shroud ring having a radially inwardly facing circumferential face which surrounds said annular array of aerofoil blades in radially spaced apart relationship and constitutes an axial portion of the radially outer extent of said annular gas passage, said shroud ring being defined by at least one heat pipe and having a plurality of passages extending therethrough which are located adjacent said radially inwardly facing circumferential face and are adapted for the passage of cooling fluid therethrough, means being provided to direct cooling fluid into said passages so that in operation, cooling fluid is passed through said passages at such a rate that any heat flux through said shroud ring in a radially outward direction is substantially eliminated, said cooling fluid being subsequently exhausted from said passages.

The invention will now be described, by way of example, with reference to the accompanying drawings in which:

FIG. 3 is a plan view of the radially inner face of the shroud of which part is shown in FIG. 2.

FIG. 4 is a sectioned side view of a portion of the gas turbine engine shown in FIG. 1 and shows a modified form of the present invention.

Figure 1:
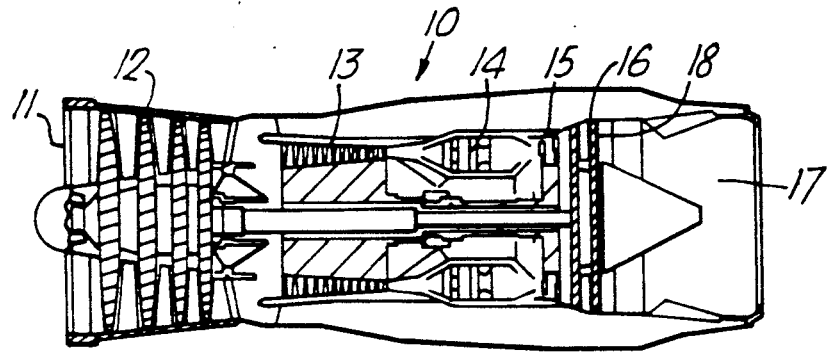
FIG. 1 is a sectioned side view of an axial flow gas turbine engine which incorporates an axial flow gas turbine in accordance with the present invention.

With reference to FIG. 1, an axial flow gas turbine engine generally indicated at 10 comprises, in axial flow series, an air intake 11, low and high pressure axial flow compressors 12 and 13, combustion equipment 14, high and low pressure axial flow gas turbines 15 and 16 and a propulsion nozzle 17. The gas turbine engine 10 functions in the conventional manner, that is air which is drawn in through the air intake 11 is progressively compressed by the low and high pressure compressors 12 and 13. The compressed air is mixed with fuel and the mixture combusted in the combustion equipment 14. The resultant gaseous combustion products expand through the high and low pressure gas turbines 15 and 16, and are exhausted to atmosphere through the propulsion nozzle 17.

Figure 2:
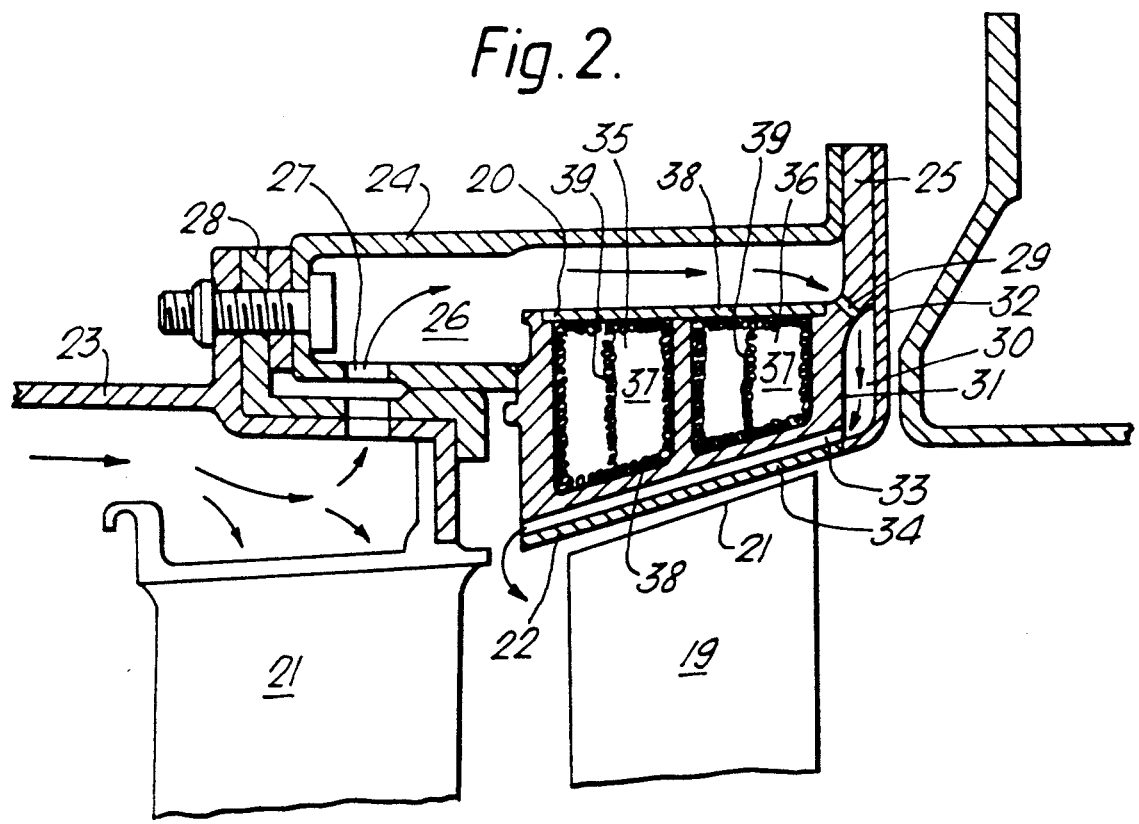
FIG. 2 is a sectioned side view of a portion of the gas turbine of the gas turbine engine shown in FIG. 1 and shows a part of a shroud of that gas turbine.

The various components of the gas turbines 15 and 16 cooperate to define an annular passage 18 for the flow of exhaust gases therethrough. The annular passage 18 contains alternate annular arrays of the stationary aerofoil vanes and rotary aerofoil blades which constitute the operative portions of the high and low pressure gas turbines 15 and 16. One of the annular arrays of rotary aerofoil blades 19 in the high pressure gas turbine 15 is surrounded by a shroud ring 20 as can be seen in FIG. 2. The rotary aerofoil blades 19, which are immediately downstream of an annular array of stator aerofoil vanes 21, are arranged such that their radially outer tips are spaced apart by a small amount from the circumferential radially inward face 22 of the shroud ring 20.

The shroud ring 20 constitutes an axial portion of the radially outer extent of the annular passage 18. It is mounted from the casing 23 of the high pressure gas turbine 15 by means of a ring member 24. The ring member 24 is of generally C-shaped cross-section and cooperates with the shroud ring 20 and a radially extending flange 25 on the shroud ring 20 to define an annular chamber 26 which is generally radially outwardly of the shroud ring 20.

The radially outer extends of the stator aerofoil vanes 21 are fed with cooling air, the flow path of which is indicated by arrows, which has been derived from the high pressure compressor 13. A portion of the cooling air passes through passages within the vanes 21 so as to facilitate their cooling. However the remainder of the cooling air passes through apertures 27 provided in the casing 23, a spacer ring 28 and the C-shaped cross ring member 24 and into the annular chamber 26. Apertures 29 provided at the radially inner extent of the flange 25 permit the exhaustion of cooling air from the chamber 26 into a second, smaller annular chamber 30 which is defined by the downstream face 31 of the shroud ring and a flanged plate 32 which is attached to the shroud ring 20. The cooling air then flows from the smaller chamber 30 into a number of axially extending passages 33 which are situated in the portion of the shroud ring 20 which is adjacent the radially inward face thereof as can also be seen in FIG. 3. The cooling air flows through the passages 33 and is exhausted therefrom at a position intermediate the stator vanes 21 and the rotor blades 19 into the gas stream which flows in operation through the gas turbines 15 and 16. It will be seen therefore that the air passing through the passages 33 provides cooling of the radially inner region of the shroud ring 20.

The channels 33 are formed by machining axially extending channels in the radially inner surface of the shroud ring 20 and then brazing a ring 34 on to the lands between adjacent channels so as to define the passages 33 therewith and also define the radially inward face 22 of the shroud ring 20. It will be appreciated, however, that the passages 33 could be formed in other ways. Thus, for instance, axial channels could be machined in the radially inner surface of the shroud ring 20 and then tubes of appropriate diameter are brazed into those channels.

The shroud ring 20 is defined by two axially adjacent annular heat pipes 35 and 36. Each of the heat pipes 35 and 36 is of conventional construction in that it comprises a hollow, evacuated chamber 37, the inner walls of which are covered by a wicking material 38 which is formed from wire mesh. Additional pieces 39 of wicking material 38 bridge the gap between the radially inner and outer regions of the hollow chambers 37. The hollow chambers 37 each contain a small amount of sodium to act as the heat transfer vehicle within the heat pipes 35 and 36. Sodium is a convenient material for use at the temperatures at which the shroud ring 20 would normally be expected to operate. It will be appreciated however that other suitable heat transfer vehicles may be employed if desired.

Heat pipes have excellent thermal conductivity properties and consequently since the shroud ring 20 is defined by heat pipes 35 and 36, then it too is of high thermal conductivity and this thereby renders the shroud ring 20 substantially isothermal.

The air which passes in operation through the passages 33 in the shroud ring 20 provides cooling of the radially inner region of the shroud ring 20. However, since the shroud ring 20 is, in operation substantially isothermal, the air flow through the passages 10 serves to provide its overall cooling. Moreover since the shroud ring 20 is substantially isothermal it is not likely to depart from approximately true roundness as a result of thermal gradients being established within it.

The cooling of the radially inner region of the shroud ring 20 brings certain advantages over shroud rings which are cooled at other positions.

Thus the shroud ring 20 is subject to axial and circumferential heat flux but not radially outward heat flux as is the case with shroud rings which are cooled other than at their radially inner region. This being so, the shroud ring 20 is less prone to thermal stress, particularly during alterations in the operating conditions of the gas turbine 15 and when it is not functioning as a heat pipe (for instance during the starting up of the gas turbine engine 10).

Moreover in the event of the failure of one or both of the heat pipes 35 and 36 to continue functioning as a heat pipe, the flow of cooling air through the passages 33 ensures that the overall temperature of the shroud ring 20 does not rise and that the shroud ring 20 continues to be unaffected by radially outward heat flux. The shroud ring 20 is thus fail safe. This is in contrast to heat pipe shroud rings which are cooled in their radially outer regions. Such shroud rings, when subject to heat pipe failure, suffer a sudden temperature increase as a result of the reduction in the thermal conductivity of the shroud ring 20. This could, in turn, lead to the structural failure of the shroud ring.

Although the present invention has been described with reference to a shroud ring 20 which is defined by two axially adjacent heat pipes 35 and 36, other heat pipe configurations could be employed. Thus the shroud ring 20 could be defined by a single heat pipe. Alternatively it could be defined by a number of arcuate heat pipes which cooperate to define the annular form of the shroud ring 20. In the latter case, the shroud ring 20 could be defined by two or more annular arrays of arcuate heat pipes which are axially adjacent and arranged so that the boundaries between the arcuate heat pipes of one array are not aligned with boundaries of the arcuate heat pipes of the adjacent array.

It is envisaged that the present invention could be modified in order to achieve the additional benefit of control over the clearance between the tips 21 of the rotary aerofoil blades 19 and the radially inward face 22 of the shroud ring 20. Such a modification is shown in FIG. 4. FIG. 4 differs from FIG. 2 only in that it depicts a sensor 40 which is located within the shroud ring 20 and terminates at the radially inward shroud face 22, and a variable valve 41 which is one of several similar such valves located within a ring member 42 which is located within the annular chamber 26.

The sensor 40 measures the distance between the radially inward shroud face 22 and the tips 21 of the rotary aerofoil blades 19 and provides an output signal which is proportional to that distance. The valves 41 control the rate of flow of cooling air through the annular chamber 26 and hence the passages 33. They are interconnected with the sensor 40 in such a manner that as the measured clearance between the radially inner shroud face 22 and the blade tips 21 decreases below a predetermined clearance, the rate of flow of cooling air through the valves decreases and vice versa. This ensures that if the blade tip clearance reduces to an undesirably low level, the flow rate of cooling air through the passages 33 is reduced to bring about an overall increase in the overall temperature of the shroud ring 20, thereby causing it to expand and increase the blade tip clearance. When the blade tip clearance increases to an undesirably high level, the rate of cooling air flow through the passages 33 is increased to bring about a reduction in the overall temperature of the shroud ring 20, thereby causing it to contract and decrease the blade tip clearances.

It will be seen therefore that this embodiment of the present invention provides a simple yet effective system for the control of blade tip clearances.

I claim:
1. An axial flow gas turbine comprising:
   structure defining an annular gas passage extending therethrough,
   an annular array of radially extending rotary aerofoil blades located such that said rotary aerofoil blades extend radially across said annular gas passage;
   a shroud ring having a radially inwardly facing circumferential face which surrounds said annular array of aerofoil blades in radially spaced apart relationship and constituting an axial portion of the radially outer extent of said annular gas passage, said shroud ring being defined by at least one heat pipe proximate the outer ends of said rotary aerofoil blades and having a plurality of passages extending therethrough which are located adjacent said radially inwardly facing circumferential face and being adapted for the passage of cooling fluid therethrough;

means for directing cooling fluid into said passages at such a rate that any heat flux through said shroud ring in a radially outward direction is substantially eliminated;

means cooperating with said shroud ring for defining an annular chamber located generally radially outwardly of said shroud ring and adjacent said at least one heat pipe, said annular chamber being adapted to receive a supply of said cooling fluid; and duct means adjacent said at least one heat pipe for interconnecting said annular chamber with said passages adjacent said radially inwardly facing circumferential face of said shroud ring to direct said cooling fluid from said annular passage into said passages, said cooling fluid being subsequently exhausted from said passages.

2. An axial flow gas turbine as claimed in claim 1 wherein said passages adjacent said radially inwardly facing circumferential face of said shroud ring are generally axially extending with regard to the axis of said gas turbine.

3. An axial flow gas turbine as claimed in claim 2 wherein said duct means interconnects said annular chamber with the downstream ends of said passages adjacent said radially inwardly facing circumferential face of said shroud ring.

4. An axial flow gas turbine as claimed in claim 1 wherein said cooling fluid is exhausted from said passages adjacent said radially inwardly facing circumferential face of said shroud ring into said annular gas passage extending therethrough.

5. An axial flow gas turbine as claimed in claim 1 wherein said shroud ring is defined by two axially adjacent heat pipes.

6. An axial flow gas turbine as claimed in claim 1 wherein distance measuring means are provided to provide an output signal which is proportional to the clearance between the radially inwardly facing circumferential face of said shroud ring and the radially outer tips of said array of rotary aerofoil blades which are surrounded by said shroud ring, means being provided to vary the flow rate of said cooling fluid directed in operation through said passages in accordance with the output signal of said distance measuring means whereby the flow rate of said cooling fluid directed through said passages is increased if the clearance between said blade tips and said shroud ring increases above a predetermined magnitude and is decreased if said clearance decreases below said predetermined magnitude.

7. An axial gas flow turbine as claimed in claim 1 wherein said cooling fluid is air.

8. An axial flow gas turbine as claimed in claim 1 wherein said gas turbine constitutes a portion of a gas turbine engine.

9. An axial flow gas turbine engine provided with a gas turbine as claimed in claim 7.

* * * * *